Dec. 18, 1962  R. W. MAAS  3,069,114
BALLOON GONDOLA ORIENTER
Filed June 26, 1961
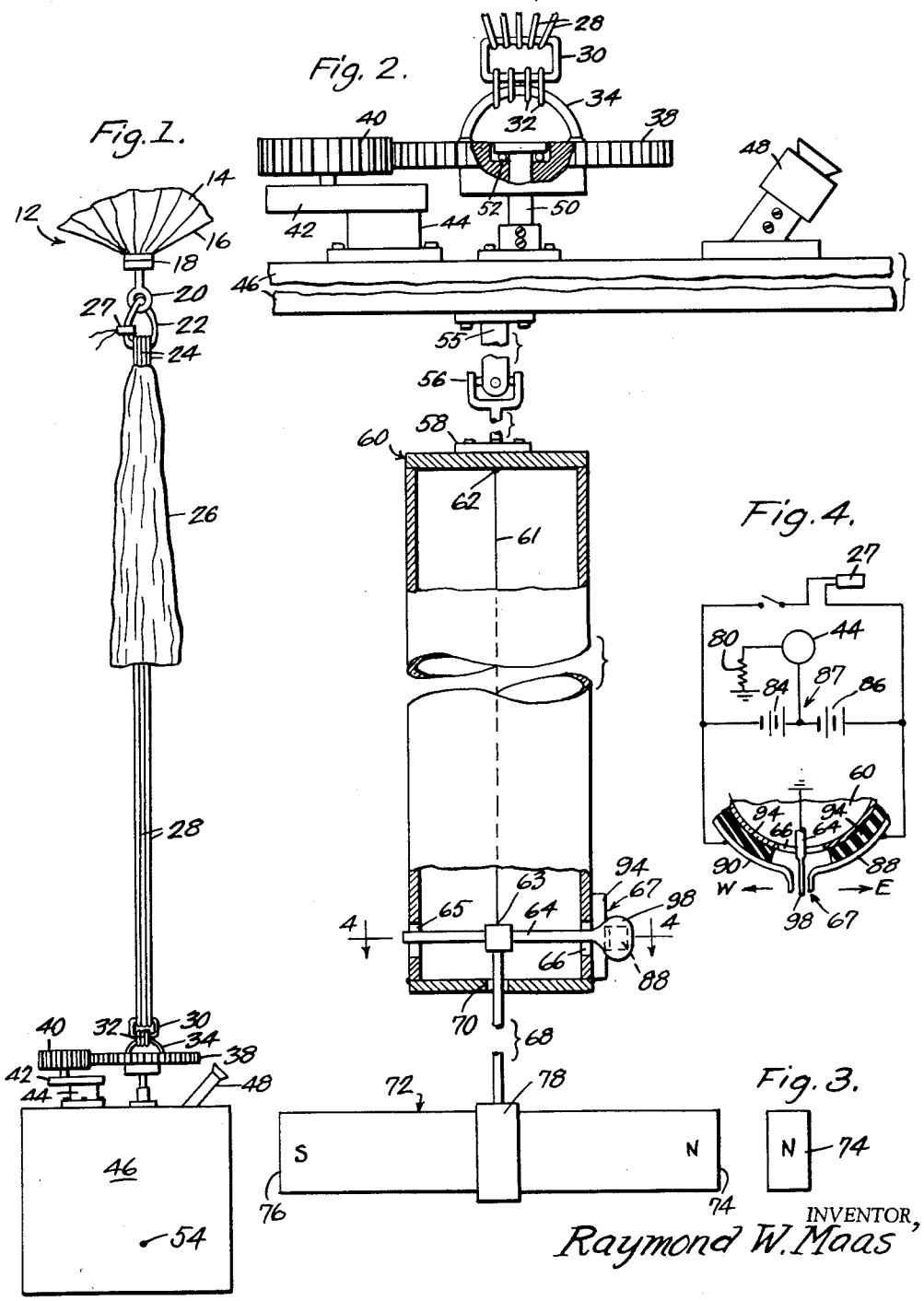
INVENTOR,
Raymond W. Maas
BY Louis Sheldon
ATTORNEY 3,069,114
BALLOON GONDOLA ORIENTER
Raymond W. Maas, Minneapolis, Minn., assignor, by mesne assignments, to the United States of America as represented by the Secretary of the Navy
Filed June 26, 1961, Ser. No. 119,750
10 Claims. (Cl. 244—31)

This invention relates to the orientation of balloon-borne equipment, and is concerned more particularly with the azimuthal orientation of a balloon-suspended gondola so that gondola-carried equipment for observation of a star or faint light source such as a zodiacal light or glow, or any other objective, may be homed on the objective for a desired sustained period of time.

Attempts to obtain sustained azimuthal orientation of a balloon-suspended gondola have in the past left much to be desired. These have involved unwieldy and weighty construction, requiring a substantially larger balloon to achieve the desired altitude, or reducing the amount of payload that can be carried, have complicated the launching technique, required (in the case of manned balloons) the attention of the gondola crew, and have failed to hold the gondola at the desired orientation for any one sustained period in excess of about 8 minutes.

It is accordingly a general object of the invention to provide rugged, simple, inexpensive, and automatic means for holding the observation equipment at a desired orientation for the desired period of time.

A more particular object is to provide means responsive to the earth's magnetic flux to maintain the observation equipment at the desired orientation.

Further objects and advantages of the invention will appear as the description proceeds.

The invention will be better understood on reference to the following description and the attached drawing, wherein:

FIG. 1 is a somewhat diagrammatic elevational view of part of a balloon system, in flight, embodying features of the invention.

FIG. 2 is an enlarged view of a portion of the system, showing features of the invention in detail.

FIG. 3 is an end elevation of the magnet of FIG. 2.

FIG. 4 is a circuit diagram including structural portions taken in part as indicated at 4—4 in FIG. 2.

The drawing shows a balloon system 12 comprising a balloon 14 whose base 16 is securely held in a fitting 18 having a load-suspending eye 20 linked by cords 22 to a loop 24 over a parachute 26, the cords passing through a cutter 27. Cords 28 hanging from the parachute hem are tied to a metal or other suitable loop 30 connected by cords 32 to a rigid yoke 34 brazed or otherwise rigidly secured to a gear 38 meshed with a pinion 40 driven through reduction gearing 42 by a reversible motor 44 rigidly secured to a gondola 46 on which a camera 48 is mounted to view an objective at predetermined angles of azimuth and elevation relative to the earth's magnetic flux, as will appear. A shaft 50, coaxial with the gear 38 and suspended therefrom by means of a thrust bearing 52, is fixed at its lower end to the gondola 46 in such location that the axis of the shaft passes through the center of gravity, which may be at 54, of the assembly consisting of the gondola and all equipment carried thereby and suspended therefrom.

A bracket 55 rigidly connected to the bottom of the gondola 46 is connected by a universal joint 56 to a bracket 58 rigidly secured to the top of a casing 60 so that the casing is torsionally rigid with the gondola but is free to assume a position in which the casing axis is plumb. A thin elastically stretchable wire 61, such as piano wire, having a diameter of, say, 4 mils, and zero twist, and acting as a frictionless bearing, is secured at its upper end 62 at a point on the axis of the casing 60, and at its lower end 63 to a rod 64 balanced horizontally and extending through oversize holes 65 and 66 in the casing. The rod 64 constitutes the movable arm or pole of a single pole double throw center-off switch 67 as will appear.

Rigidly secured to and suspended from the rod 64 is an elongated pin 68 coaxial with the wire 61 and extending through an oversize hole 70 in the bottom of the casing 60. A bar magnet 72 having its north and south poles respectively at 74 and 76 is suspended from the pin 68 by means of a bracket 78 rigidly connected in such manner that the magnet extends horizontally when the pin is plumb.

One terminal of the motor 44 is grounded through a resistor 80, and the other terminal is center-tapped between sections 84 and 86 of a battery 87 carried by the gondola 46. The battery sections 84 and 86 are respectively connected to stationary contacts 88 and 90 of the switch 67. The contacts 88 and 90 are secured to insulation plates 94 connected to the casing 60, and straddle and are selectively engageable by the switch pole wafer end 98, which may also occupy intermediate positions in which it touches neither of the contacts.

The several connections linking the parts of the load train are of such nature that very little relative twist occurs throughout the balloon system. As the balloon system soars it may undergo some spinning, but at ceiling altitude the system is substantially rotationless. During the ascent, the magnet 72 of course tends to orient itself in line with the nearest earth's magnetic flux, but, within the play afforded the rod 64 in the casing holes 65 and 66, the magnet will essentially spin with the remainder of the system. When ceiling altitude is reached, the spinning will have ceased.

The camera 48 is mounted so that its focal direction is at the same angle of elevation as the objective, and will be at the same azimuthal angle as the objective when the magnet 72 is parallel to the horizontal component of the earth's magnetic flux. The direction of the flux is not always constant, of course, but the variation is so small, at most on the order of one or two degrees, that, in the region in which the balloon will float at ceiling altitude during the desired period of observation, the effect is negligible.

Assuming the balloon system has just ceased to spin when the camera 48 is focused in a direction azimuthally clockwise of the objective, it follows that the magnet's north pole 74 will be oriented through substantially the same angle azimuthally clockwise relative to the earth's magnetic flux, and accordingly will be magnetically biased to swing anticlockwise. Under the influence of this bias, the wafer 98 will be brought into and held in engagement with the switch contact 88, thus closing the motor circuit through the battery section 84 and turning the motor 44 in the direction to rotate the pinion 40 anticlockwise. The gear 38, being connected to the balloon in a manner to permit of slight relative twist, thus will be caused to turn clockwise slightly until it offers too much resistance to further turning or until the pinion 40 stops accelerating, and during this action the pinion will turn only about its axis, so that the gondola 46, and hence the camera 48, will be stationary. However, as the pinion 40 continues to turn anticlockwise, while the gear 38 is stationary, the pinion will planetate anticlockwise about the gear and consequently the gondola 46 and all equipment supported by it will likewise turn anticlockwise. Thus the camera 48 will approach and eventually reach a position in which it can "see" the objective. When this position is reached, the magnet 72 will be oriented with the earth's magnetic flux and will therefore come substantially to a stop. The momentum of the gondola 46 and equipment supported thereby will cause them to continue turning somewhat after the magnet 72 has stopped, thereby separating the contact 88 from the wafer 96 and breaking the motor circuit, whereupon untwisting of the equipment between the balloon 14 and the gear 38 will turn the gear anticlockwise, causing the pinion 40, and hence the gondola, to turn as a unit with the gear, so that the gondola undergoes slight additional overriding, thereby bringing the contact 90 into engagement with the wafer 98 and reverse running the motor off the battery section 86 to reverse-turn the gondola. This oscillation cycle may repeat a few times, with the gondola hovering until it comes to a stop with the wafer 98 spaced from both contacts 88 and 90. From the foregoing, the operation causing initial anticlockwise orientation of the camera and final orientation to enable it to steadily "see" the objective is obvious. The cyclic correction is very slow and happens a few cycles per minute. If for any reason the balloon assumes a different position rotationally, it is obvious that correction will automatically result.

The camera 48 could have a lens covering an expanse of about 5° east-west and of about 2° north-south. This area would be so much greater than that of the objective that the camera would see the objective throughout the period (2 hours, for example) of float, and, if the light from the objective were very faint, the camera could be set to take several exposures, each of substantial duration (say 10 minutes, more or less). From known data the flight will be known to drift not more than 5°.

The motor 44 has a speed such that the pinion 40 is driven slowly, say 1 r.p.m.

The axis of the casing and wire 61, when plumb, may be displaced from the center of gravity 54, as shown, or may contain the center of gravity.

The wire 61 is preferably elastic to absorb shock and thus avoid breaking or excessive permanent elongation on sudden rise or descent of the system.

If desired, the casing 60 could be suspended by any other suitable torsion-rigid universal joint, such as a non-twistable flexible hose, for example.

While a preferred embodiment has been described in some detail, it should be regarded as an example of the invention and not as a restriction or limitation thereof as many changes may be made in the construction and arrangement of the parts without departing from the spirit and scope of the invention.

I claim:
1. In a balloon system, a balloon, a sun gear having a vertical axis and suspended from and substantially non-rotatable relative to the balloon, a gondola journaled to the sun gear about said axis and suspended from the sun gear, a reversible motor mounted on the gondola, a pinion driven by the motor and meshing with the sun gear, a torsion pendulum hanging plumb and suspended from the gondola, the pendulum weight including a balanced horizontal permanent magnet, a single pole double throw center-off switch whose pole is mounted to move with the magnet, the switch contacts being mounted to turn with the gondola, and means including the switch and responsive to azimuthal displacement between the magnet and the horizontal component of the earth's magnetic flux for driving the motor in the direction to eliminate the displacement.

2. The structure of claim 1, characterized in that the torsion element of the pendulum has negligible twist within the range of movement of the pole relative to the contacts.

3. The structure of claim 1, characterized in that the axes of rotation of the gondola and magnet are displaced from each other.

4. The structure of claim 1, characterized in that the torsion element of the pendulum has negligible twist within the range of movement of the pole relative to the contacts, and the axes of rotation of the gondola and magnet are displaced from each other.

5. In a balloon system, a balloon, a sun gear arranged with its axis vertical and suspended from and substantially torsion-rigid with the balloon, a gondola, means comprising a thrust bearing coaxial with the gear and suspending the gondola from the gear, a reversible motor mounted on the gondola, a pinion driven by the motor and meshing with the gear, a switch comprising a pair of horizontally spaced contacts mounted to rotate with the gondola and a switch arm supported by the gondola and rotatable between the contacts, a horizontal permanent magnet rotatable about a vertical axis and suspended from the gondola and driving the arm, and a center-tapped battery electrically connected through the switch to the motor.

6. The structure of claim 5, characterized in that the axis of rotation of the magnet is displaced from the gear axis.

7. In a balloon system, a balloon, a collapsed parachute, a sun gear, substantially torsion-rigid means suspending the parachute from the balloon and the sun gear from the parachute, said means including means holding the gear coaxial with the parachute, a gondola, means including a thrust bearing coaxial with the gear and suspending the gondola from the gear, a reversible motor mounted on the gondola, a pinion driven by the motor and meshing with the gear, a tube hanging plumb from but torsionally rigid relative to the gondola, an elastic wire within and rigidly fixed at one end to and hanging plumb from the upper end of the tube, and spaced from the peripheral wall of the tube, a switch comprising a pair of horizontally spaced switch contacts mounted on the tube and a switch arm balanced on and secured to the lower end of the wire and projecting between the contacts, a center-tapped battery electrically connected through the switch to the motor, a horizontal magnet below the tube and rigidly connected to the switch arm and balanced relative to the wire, the wire having negligible twist within the range of movement of the switch arm between the contacts, and means on the tube for confining the switch arm between the switch contacts, the center of gravity of the gondola and all parts supported thereby lying on the gear axis, the axis of the wire being displaced from the gear axis.

8. In a balloon system:
a balloon;
a sun gear having a vertical axis and suspended from the balloon;
a gondola journaled to the sun gear about said axis and suspended from the sun gear;
a reversible motor mounted on the gondola;
a pinion driven by the motor and meshing with the sun gear;
a torsion pendulum hanging plumb and suspended from the gondola;
the pendulum weight including a balanced horizontal permanent magnet;
a single pole double throw center-off switch whose pole is mounted to move with the magnet;
the switch contacts being mounted to turn with the gondola;
and means including the switch and responsive to azimuthal displacement between the magnet and the horizontal component of the earth's magnetic flux for driving the motor in the direction to eliminate the displacement.

9. In a balloon system:
a balloon;
a sun gear arranged with its axis vertical and suspended from the balloon;
a gondola;
means comprising a thrust bearing coaxial with the gear and suspending the gondola from the gear;
a reversible motor mounted on the gondola;
a pinion driven by the motor and meshing with the gear;
a switch comprising a pair of horizontally spaced contacts mounted to rotate with the gondola and a switch arm supported by the gondola and rotatable between the contacts;

a horizontal permanent magnet rotatable about a vertical axis and suspended from the gondola and driving the arm;

and a center-tapped battery electrically connected through the switch to the motor.

10. In a balloon system:

a balloon;

a sun gear;

means suspending the sun gear from the balloon with the gear axis vertical;

a gondola;

means including a thrust bearing coaxial with the gear and suspending the gondola from the gear;

a reversible motor mounted on the gondola;

a pinion driven by the motor and meshing with the gear;

a tube hanging plumb from but torsionally rigid relative to the gondola;

an elastic wire within and rigidly fixed at one end to and hanging plumb from the upper end of the tube and spaced from the peripheral wall of the tube;

a switch comprising a pair of horizontally spaced switch contacts mounted on the tube and a switch arm balanced on and secured to the lower end of the wire and projecting between the contacts;

a center-tapped battery electrically connected through the switch to the motor;

a horizontal magnet below the tube and rigidly connected to the switch arm and balanced relative to the wire;

the wire having negligible twist within the range of movement of the switch arm between the contacts;

and means on the tube for confining the switch arm between the switch contacts;

the center of gravity of the gondola and all parts supported thereby lying on the gear axis.

References Cited in the file of this patent

UNITED STATES PATENTS

| | | |
|---|---|---|
| 980,155 | Hertzberg | Dec. 27, 1910 |
| 1,882,730 | Avery | Oct. 18, 1932 |
| 2,151,336 | Scharlau | Mar. 21, 1939 |
| 2,511,688 | Beauchamp | June 13, 1950 |